EFFECT OF CURRENT, USED AS THE INITIATOR, ON RATE OF POLYMERIZATION OF $\varepsilon$ - CAPROLACTONE AND ETHYLENE OXIDE Current Used
I $8 \times 10^{-3}$ F/mole
II $1.6 \times 10^{-3}$ F/mole
III $8 \times 10^{-4}$ F/mole

RATES OF DISAPPEARANCE OF $\varepsilon$ - CAPROLACTONE AND ETHYLENE OXIDE DURING COPOLYMERIZATION ⊙ Caprolactone
△ Ethylene Oxide

United States Patent Office 3,645,986
Patented Feb. 29, 1972

1

3,645,986
ELECTRO-INITIATED POLYMERIZATION
HETEROCYCLIC MONOMERS
Mahmoud R. Rifi, Kendall Park, N.J., assignor to
Union Carbide Corporation, New York, N.Y.
Continuation-in-part of application Ser. No. 875,437,
Nov. 10, 1969. This application Apr. 9, 1970, Ser.
No. 27,160.
Int. Cl. C08g *23/02, 23/14*
U.S. Cl. 260—79
10 Claims

ABSTRACT OF THE DISCLOSURE

Electro-initiated polymerization of heterocyclic monomers including cyclic ethers, sulfides, cyclic esters and cyclic amines has been effected by generating a cationic catalyst electrochemically from one of the monomers itself in the presence of a supporting electrolyte in an anolyte compartment and then adding this catalyst to a monomer optionally containing an organic diol, triol, or polyol as a starter or polymerization regulator.

BACKGROUND OF THE INVENTION

Figure 1:
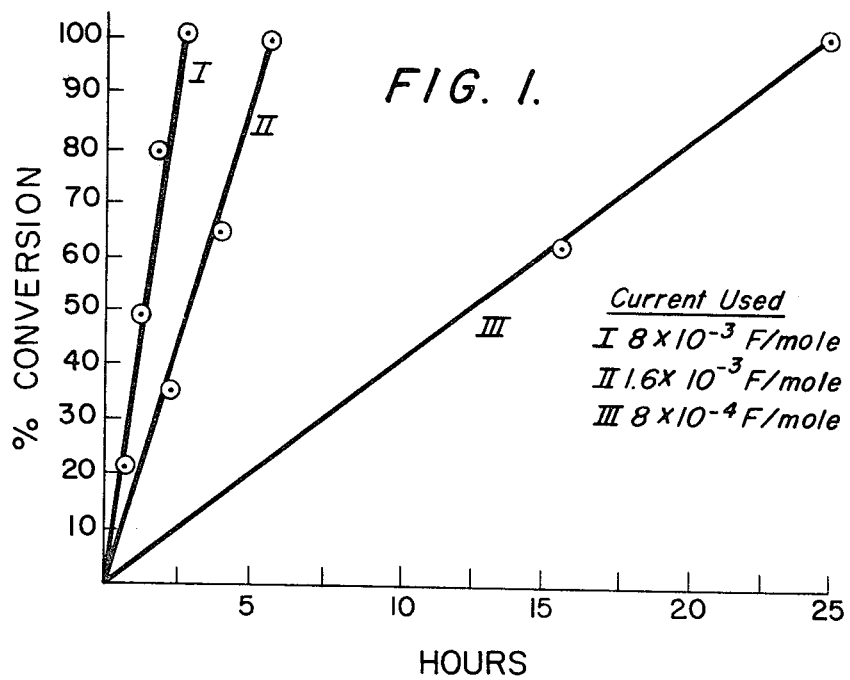

This is a continuation-in-part of Ser. No. 875,437, filed Nov. 10, 1969 and now abandoned.

This invention relates to the polymerization of heterocyclic monomers and in particular to the use of electro-initiated polymerization catalysts for the preparation of both known and novel polymers.

The scientific literature contains isolated examples of electro-initiated polymerization effected in an electrolytic cell containing a monomer. These references describe free radical, anionic, and cationic polymerizations initiated at either the anode or the cathode. The electrolytically-initiated polymerization of cyclic monomers was reported by B. Yamazaki (Adv. Polymer Sci., vol. 6, p. 377, 1969). He observed the formation of low molecular weight polytetrahydrofuran in an anodic solution when an electric current was passed through a solution of styrene and tetrabutyl ammonium perchlorate in tetrahydrofuran. Styrene was polymerized at the cathode and no copolymers were observed in either solution. K. Hamann polymerized caprolactam by electrolyzing a molten solution of caprolactam, isocyanate and an alkaline salt obtaining a polyamide coated around a steel cathode (Makromol. Chem. 99, 103, 1966).

The progress of electro-initiated polymerizations has been impeded by such physical obstacles as the fouling of the electrodes by the polymerization product and chemically by numerous side reactions, not the least of which are chemical reactions with solvent, electrolyte, and other components of the bath as well as further attack or decomposition of the polymer formed.

Cyclic monomers such as tetrahydrofuran, ethylene oxide, caprolactam, ethylene sulfide, and the like have been polymerized successfully with Lewis and other acids but these techniques have often been found to be undesirable because of the difficulty and danger of handling such catalysts as boron trifluoride, phosphorous pentafluoride, and the like. Furthermore it is difficult to remove traces of these catalysts from the polymerized products which is necessary in some cases to prevent depolymerization and in other instances where the end uses of the polymer require a rigorous elimination of inorganic materials. Another drawback to the use of chemical polymerization initiators lies in the difficulty of controlling molecular weight of the polymer produced because of the extreme activity of these catalysts.

SUMMARY OF THE INVENTION

It has now been found that a number of heterocyclic monomers can be polymerized to a catalyst free polymer and varying molecular weights by a method which comprises the steps of:

(A) Preparing a polymerization catalyst in a divided electrolysis cell having an anolyte compartment and a catholyte compartment by electrolyzing: (1) a solution of at least one heterocyclic monomer having the formula:

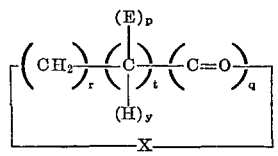

wherein $r$ is an integer having values of 2 to 5, each of $p$ and $y$ is an integer having values of 0 to 2 wherein $p+y=2$, each of $q$ and $t$ is an integer having values of 0 to 1, E is a monovalent radical selected from the class consisting of chlorine, lower alkyl having 1 to 3 carbon atoms, phenyl and lower alkyl substituted phenyl and X is a divalent radical selected from the group consisting of —O—, —S—, or

with at least 0.006%, based on the weight of said heterocyclic monomer, of a supporting electrolyte having the formula:

$$A^+(M^-)_z$$

wherein $z$ is an integer having values of 1 to 2 and A is a cation elected from the group consisting of alkali metals, alkaline earth metals and quaternary onium ions having the formula $(R)_4D^+$ wherein each of R is a monovalent radical selected from the group consisting of hydrogen, alkyl having 1 to 10 carbon atoms or aryl having 6 to 10 carbon atoms and D is an element selected from the group consisting of nitrogen and phosphorus, and M is an anion selected from the group consisting of $BF_4^-$, $ClO_4^-$, $PF_6^-$, $HF_2^-$, $^-O_3SC_6H_5CH_3$, or $CO_3^{--}$ in the anolyte compartment and (2) a solution of at least 0.006% by weight of a supporting electrolyte selected from the group consisting of (a) 

$$(R)_4N^+M^-$$

wherein R and M are as defined above and N is nitrogen (b) $$(R)_4B^-Q^+$$

wherein R is as defined above, B is boron, and Q is a cation selected from the group consisting of Li, K, Na, Ca, Mg or Zn, (c) $$(R)_4Al^-Q^+$$

wherein R and Q are as defined above and Al is aluminum, (d) alkali metal halides, and (e) alkaline earth halides in a polar solvent in the catholyte compartment at a temperature of about —20 to 200° C. with at least 0.001 Faradays per mole of heterocyclic compound;

(B) Mixing about 0.1 to 10 parts by weight of the catalyst prepared in (A) above with about 100 parts by weight of at least 1 heterocyclic monomer having the formula:

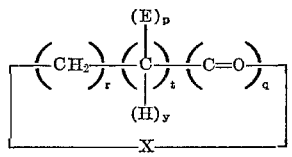

wherein $r$, $p$, $q$, $t$, $y$, E, and X are as defined above, under an inert atmosphere in a closed polymerization system;

(C) Agitating the mixture of (B) for at least 1 minute at a temperature of about $-20$ to $200°$ C.; and (D) Recovering the polymerized product.

DESCRIPTION OF THE INVENTION

The preferred heterocyclic monomers represented by the formula above includes cyclic ethers such as ethylene oxide, 1,2-propylene oxide, epichlorohydrin, tetrahydrofuran and the like; cyclic organic sulfides such as ethylene sulfide, 3,3-dimethyl thiacyclobutane, 3-methyl-3 ethyl thiacyclobutane, and the like; cyclic organic amines such as ethylene imine; and cyclic organic esters such as propiolactone, butyrolactone, caprolactone and the like.

The polar solvent used in the catholyte compartment of the electrolyses cell during the preparation of the electro-initiated catalyst is ideally a solvent that can be readily reduced at the cathode. Exemplary of the polar solvents which can be used in the practice of this invention are aliphatic hydrocarbons containing cathode reduceable groups such as nitro, sulfone, sulfoxide, cyano, carbonate groups, halogen groups and the like; and nitrobenzene, dimethyl formamide, dimethyl sulfoxide, acetonitrile, propylene carbonate and the like; and cyclic ethers such as tetrahydrofuran, pyran and the like; and alicyclic esters such as epsilon-caprolactone, $\gamma$-butyrolactone, $\beta$-propiolactone, and the like.

Pressure is not critical for either the preparation of electro-initiated catalysts or the polymerization reaction itself. For economical reasons atmospheric pressure is generally preferred although sub-atmospheric or super-atmospheric pressures can be used if desired. Where the monomer is a gas at atmospheric pressure such as ethylene oxide, nominal super-atmospheric pressures up to the autogenous pressure sufficient to keep the monomer as a liquid at the polymerization temperature, are used.

In these polymerizations, temperature is not critcial. For convenience temperatures in the range of about 0 to $90°$ C. can be used with temperatures of about 20 to $50°$ C. being preferred in order to obtain practical polymerization rates.

The polymerization can be carried out in bulk, non-aqueous suspension, emulsion or solution. Where the polymerization is carried out in solution or in non-aqueous suspension the solvents or diluents are not narrowly critical since chain transfer is not a factor and so, liquid aliphatic, alicyclic, or aromatic hydrocarbons well-known in the polymerization art can be used.

Since the molecular weight of the polymeric product is independent on the concentration of electro-initiated catalysts in the polymerization system, the amount of heterocyclic compound actually electrolyzed in the anolyte compartment is not narrowly critical inasmuch as only a portion of the total charged to the anolyte compartment becomes a catalyst or initiator. In the simplest sense the generation of a single cation by the electrolysis of a single molecule of one of the heterocyclic compounds enumerated above would be sufficient, to initiate polymerization of one of the heterocyclic monomers enumerated above. However, for practical purposes many more cations are required and so for convenience sake the invention is described in terms of the passage of a given number of Faradays through a given number of moles of the heterocyclic monomer and then the addition of the electrolyzed heterocyclic monomer, to a given amount of heterocyclic monomer in the polymerization reactor. It will be understood therefore by those skilled in the art that the values given for the number of Faradays of electricity per mole or number of coulombs passed through the electrolysis cell and the ratio of electrolytically initiated catalysts to heterocyclic monomer are not rigid values but rather a good deal of latitude can be used in the choice of these values.

Conventional polymerization equipment can be used for the polymerization of the heterocyclic monomers enumerated. In the case of gaseous monomers an autoclave or pressure vessel is required.

The electro-initiated catalysts are prepared with conventional electrolysis equipment utilizing readily available sources of direct current capable of delivering voltages up to 150 volts D.C. and amperages up to about 10 amperes.

The temperature at which the electro-initiated catalysts are prepared is not critical but ambient temperatures are preferred for ease of operation.

Examples of supporting electrolytes represented by the formula $A^+(M^-)_z$ wherein A is an alkali metal include: sodium perchlorate, potassium fluoroborate, lithium perchlorate, and the like. Where A is an alkaline earth metal representative supporting electrolytes include barium perchlorate, magnesium fluoroborate, strontium p-toluenesulfonate and the like.

Where A is $(R)_4D^+$ and D is phosphorous exemplary supporting electrolytes include tetrabutyl phosphonium perchlorate, tetramethyl phosphonium fluoroborate, and the like:

Specific examples of supporting electrolytes where A is represented by the formula $(R)_4D^+$ and D is nitrogen include: tetramethylammonium fluoroborate, tetraethylammonium fluoroborate, tetra-n-butylammonium perchlorate, ammonium fluoroborate, tetra-n-propylammonium hexafluorophosphate, tetraethylammonium p-toluene sulfonate, tetraethylammonium bifluoride, tetramethylammonium carbonate, tetra-n-butylammonium carbonate and the like.

Specific examples of supporting electrolytes represented by the formula $(R)_4B^-Q^+$ include sodium tetramethyl boron, lithium tetraethyl boron, potassium tetra-n-butyl boron, calcium tetramethyl boron, magnesium tetraethyl boron, zinc tetramethyl boron, sodium tetraphenyl boron, lithium tetraphenyl boron, potassium tetraphenyl boron and the like where R and Q are as defined above.

Specific examples of supporting electrolytes having the formula $(R)_4Al^-Q^+$ include sodium tetramethyl aluminum, lithium tetraethyl aluminum, potassium tetraethyl aluminum, magnesium tetraethyl aluminum, calcium tetramethyl aluminum, zinc tetraethyl aluminum, and the like where R and Q are as defined above.

Specific examples of alkali metal halides include sodium chloride, sodium bromide, potassium chloride, potassium iodide, lithium chloride, lithium fluoride and the like.

Specific examples of alkaline earth halides include barium chloride, magnesium bromide, magnesium iodide, strontium fluoride and the like.

The amounts of supporting electrolytes in both the anolyte and catholyte compartments are not narrowly critical. However, in the anolyte it is preferred to use about 0.006 to 0.01% of electrolyte based on the weight of heterocyclic compound with 0.006 to 0.06% being more preferred. In the catholyte a range of about 0.006 to 1.0% of electrolyte based on the weight of polar solvent is preferred with a range of 0.006 to 0.1% being particularly preferred.

The polymerization starters when used in the practice of this invention include diols such as ethylene glycol, 1,2-propylene glycol, 1,3-propylene glycol, 1,4-butane diol, and the like; ether diols such as diethylene glycol, triethylene glycol, tetraethylene glycol, and the like; ester diols such as 2,2-dimethyl-1,3-propane diol mono(hydroxypivalate), ε-caprolactone diols of molecular weight of 2000 to 10,000 having the repeating unit

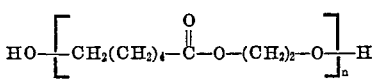

where n is a whole number denoting the degree of polymerization, and the like; triols such as 1,1,1-trimethylol propane and the like; and polyols such as pentaerythritol, and the like.

A "starter" is defined in this invention as an organic diol, triol or polyol whose function is to regulate the molecular weight of the polymer formed by taking part in the initial polymerization reaction. Generally speaking the higher the concentration of the starter the lower the molecular weight of the polymer formed. When employing starter in the practice of this invention it is preferred to use about 0.1 to 5 parts per hundred of heterocyclic monomer although amounts outside of this range can also be used.

Apparatus suitable for use as the electrolysis cell in the practice of this invention is known in the art together with techniques for providing a separate anolyte and catholyte compartment. Thus for example a semi-permeable membrane such as cellophane can be used to divide a glass reaction flask or a porous porcelain thimble can be mounted in a reaction flask thus providing separate compartments.

The choice of electrode material for fabricating either the anode or the cathode is not critical. Suitable materials include metals such as platinum, lead, silver, nickel and the like and alloys thereof as well as non-metallic electro-conducting substances such as carbon and the like.

For the preparation of the electro-initiated catalyst it is preferred to use a voltage of about 10 to 30 volts D.C., and an amperage of about 0.5 to 1 amps, or stated another way about 50 to 100 coulombs or 0.0005 to 0.001 Faradays per mole of heterocyclic monomer. However, a range of 10 to 100 coulombs as well as 10 to 200 coulombs, or 0.01 to 0.1 Faradays per mole as well as 0.0001 to 0.001 Faradays per mole can also be used if desired.

A unique advantage of this electro-initiated polymerization system lies in the fact that polymers can be provided which are free of catalyst residues. In some end uses this is highly desirable because the absence of catalyst residues enhances resistance to degradation and formation of color bodies. In other applications freedom from catalyst residues is de rigeur as in the case of low molecular weight epsilon-caprolactone/ethylene oxide copolymers which are used as diol reactants for the preparation of polyurethanes. The widely used cationic catalyst, boron trifluoride, is undesirable for the preparation of such low molecular weight caprolactone/ethylene oxide copolymers because of the fact that it is highly corrosive and its removal from the product copolymer prior to the preparation of the polyurethane is required. Another example demonstrating the need for a polymerization technique not based on conventional initiators is that of the use of polyethylene oxide in electronic applications where it is used as an adhesive for coating phosphorescent material onto television tubes and is then burned off leaving the phosphorescent material in place. Any inorganic residues remaining from the polymerization catalyst prevent the use of polyethylene oxide for this application. Polymers made by the practice of the instant invention leave ash free residues when burned.

Another advantage of this polymerization technique is the ease of formation of block copolymers. Since the polymerization proceeds through a living oxonium ion, a second monomer can be introduced after the polymerization of the first in the polymerization reactor. An alternative modification for the production of block polymers consists in producing two homopolymers the first initiated by a cationic catalyst produced in the anolyte chamber and the second initiated by an anionic catalyst generated in the catholyte compartment. When both homopolymers are brought together in a polymerization chamber a block copolymer was produced by the interaction of the positive and the negative living ions.

In the polymerizations of this invention the molecular weight of the polymer produced is inversely proportional to the amount of current used to produce the initiator at a fixed polymerization time in the absence of a starter polyol. However when a starter polyol is used the molecular weight of the polymer formed is independent of the current used to generate the initiator but rather is dependent on the concentration of a starter polyol used provided that less than 1 Faraday per mole of polyol is used. This effect is demonstrated with one of the preferred products made available by the practice of this invention, namely, the preparation of low molecular weight epsilon-caprolactone/ethylene oxide copolymers used in the preparation of polyurethanes. These copolymers have a molecular weight of about 1,000 to about 4,000 and the mole ratio of epsilon-caprolactone to ethylene oxide is in the range of about 50:50 to 70:30. A particularly preferred copolymer for polyurethane formation is one having a molecular weight of about 2,000 and a mole ratio of epsilon-caprolactone to ethylene oxide of about 65:35. As will be shown later these copolymers are true random copolymers as demonstrated by their nuclear magnetic resonance (NMR) spectra and by the kinetics of the polymerization reaction. Vapor phrase chromatography demonstrated that the disappearance of epsilon-caprolactone monomer and that of ethylene oxide monomer from the reaction vessel during the polymerization reaction were nearly comparable. The identity of this polymeric product as a diol was demonstrated by its transformation to a high molecular weight polycarbonate by reaction with phosgene and to a polyurethane by its reaction with methylene bis-(4-phenylisocyanate). The mechanical properties of the polyurethane made through the epsilon-caprolactone/ethylene oxide diol copolymer prepared by the electro-initiated catalyst compared closely with the same polyurethane made by an epsilon-caprolactone/ethylene oxide diol copolymer made by the conventional copolymerization with $BF_3$ as the polymerization catalyst.

Although in the preparation of low molecular weight (ca. 2000) epsilon-caprolactone/ethylene oxide diol copolymers where ethylene glycol is used as the starter, the molecular weight of the product was independent of the amount of current used to prepare the electro-initiator catalyst, the amount of current used does have a large effect on the rate of the reaction as shown in FIG. 1.

It will be appreciated by those skilled in the art that this invention offers significant advantages over the prior art in that in addition to affording an ash-free polymer product, the actual polymerization is not carried out in an electrolytic cell which is more expensive and cumbersome than conventional polymerization equipment, since the electro-initiation process is only used for the preparation of the polymerization catalyst itself. Thus problems such as varying power requirements due to polymer deposition on the electrodes as well as fluctuating electrical current due to viscosity changes with increased polymer production are obviated.

The random nature of epsilon-caprolactone/ethylene oxide copolymers prepared as in Example 1 infra was demonstrated by comparing the NMR spectra of such a copolymer with a mixture of epsilon-caprolactone and ethylene oxide homopolymers. The absence of a singlet peak at 3.55 p.p.m. (parts per million) in the spectrum of the copolymer indicates the absence of any appreciable amount of ethylene oxide block in the copolymer product.

Figure 2:
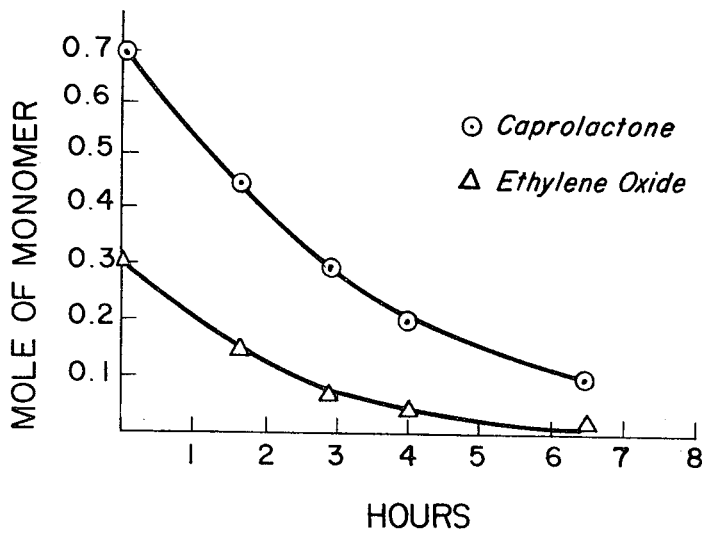

The random nature of the copolymer product prepared according to Example 1 was also shown by the kinetics of the polymerization reaction as shown in FIG. 2. The plot of moles of monomer as the ordinate v. polymerization time in hours as the abscissa shows that the rates of polymerization of both epsilon-caprolactone and ethylene oxide were nearly the same by measuring the disappearance of each of the monomers by vapor phase chromatography.

Control of molecular weight of epsilon-caprolactones/ethylene oxide copolymers

Figure 3:
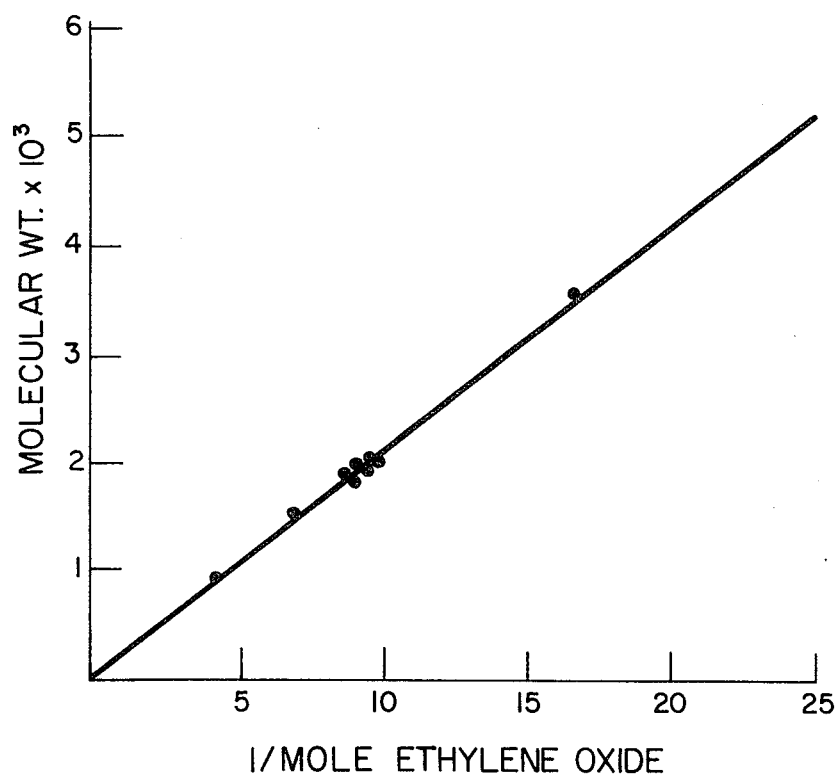

When ethylene glycol is used as the starter in the copolymerization of epsilon-caprolactone and ethylene oxide the molecular weight of the resultant diol copolymer was found to follow the relation:

$$\text{Molecular wt.} = \frac{\text{Wt. of monomers}}{\text{Moles of ethylene glycol}}$$

up to molecular weight of about 4,000. This relationship is shown graphically in FIG. 3.

Although the invention is not to be bound by any particular theory or mechanism it is suggested that the following series of equations delineates the mechanism for the copolymerization of epsilon-caprolactone and ethylene oxide using electro-initiated epsilon-caprolactone anion as the catalyst and ethylene glycol as starter:

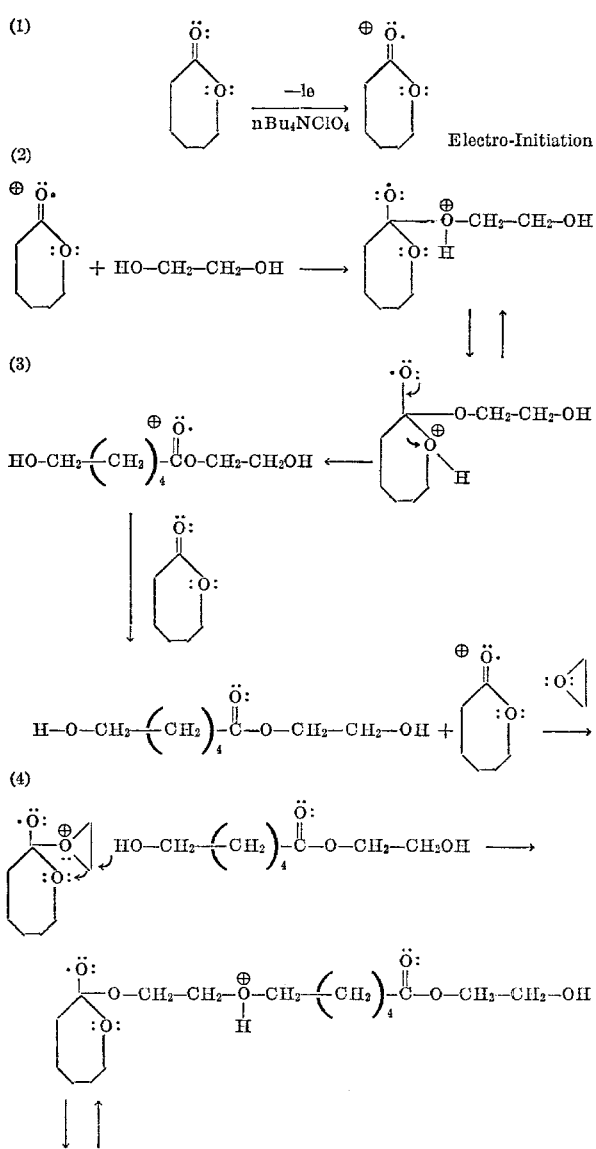

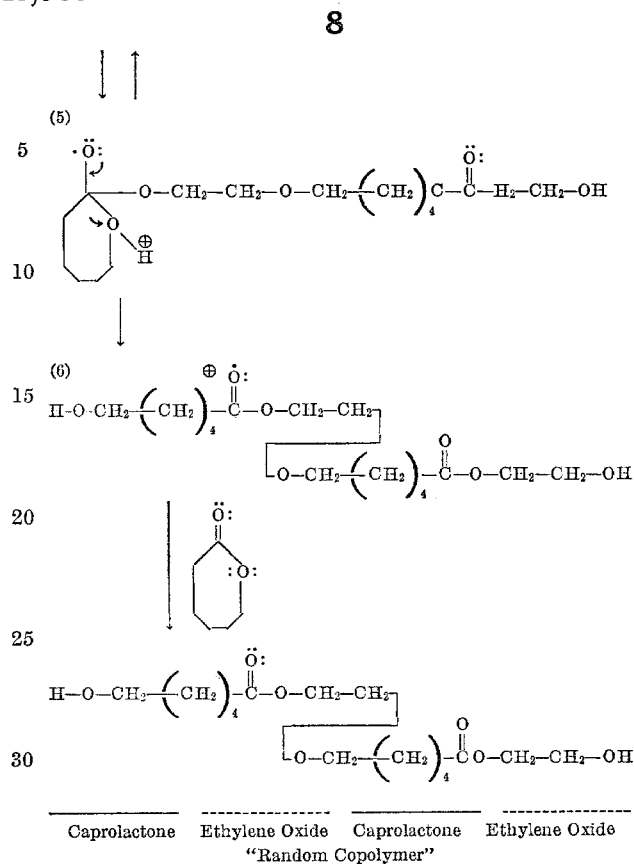

Caprolactone  Ethylene Oxide  Caprolactone  Ethylene Oxide
"Random Copolymer"

Step (1) is supported by the fact that epsilon-caprolactone oxidizes at a lower potential than n-tetrabutylammonium perchlorate and that the electrolyzed solution of epsilon-caprolactone and n-tetrabutylammonium perchlorate exhibits a broad electron spin resonance signal.

The invention is further described by the examples which follow. All parts and percentages are by weight unless otherwise specified.

EXAMPLE 1

The electrolysis cell used for the preparation of the polymerization catalyst consisted of a 3-neck 250 ml. resin kettle having a take-off tube attached to the bottom, an unglazed porcelain extraction thimble suspended inside and the necks closed with serum stoppers. A copper wire lead connected the positive side of a D.C. power supply capable of providing up to 120 volts and 0.5 amp direct current to a 2 x 2″ platinum anode through one of the serum stoppers. A lead cathode 2 x 2″ connected by a copper wire lead through the center serum stopper to the negative post of the power supply rested in a porcelain thimble (2 inches high and 2″ in diameter) which served as the cathode compartment. There were placed 20 ml. of epsilon-caprolactone and 0.1 gram of n-tetrabutylammonium perchlorate in the resin kettle which represents the anode compartment of the electrolysis cell. The porcelain thimble cathode compartment was charged with a solution consisting of 25 ml. of epsilon-caprolactone, 25 ml. of tetrahydrofuran and 4 grams of n-tetrabutylammonium perchlorate. About 900 coulombs (0.05 percent of the theoretical amount needed to electrolyze all of the monomers) was passed through the cell in order to prepare the catalyst in the anode compartment. This catalyst or electrolyzed product was drained off through the stopcock in the bottom of the resin kettle and charged to a 1 gallon stainless steel autoclave together with 1300 grams (11.4 moles) of epsilon-caprolactone and 53.3 grams (0.86 mole) of ethylene glycol. The autoclave was then sealed shut and 270 grams (6.1 moles) of ethylene oxide from lecture bottles purchased from Matheson Coleman Co. was passed into the autoclave through a metering valve. The autoclave was then heated slowly with stirring. An exothermic reaction took place raising the temperature in the autoclave to about 100° C. and the pressure to a maximum of about 50 p.s.i.g. Heating was continued at about 100° C. for 14 to 16 hours after which time the autoclave was cooled and the epsilon-caprolactone/ethylene oxide copolymer diol was removed. This product amounted to 1620 grams and had an acid number of 0.3 and a molecular weight=1950 based on a weight percent hydroxyl determination.

EXAMPLE 2

Example 1 was repeated with the following results. The epsilon-caprolactone/ethylene oxide copolymer diol obtained amounted to 1610 grams and had an acid number of 2.1 and a molecular weight of 2100.

EXAMPLE 3

Example 1 was repeated with the exception that 50 ml. of tetrahydrofuran was substituted in the cathode compartment for the mixture of 25 ml. of tetrahydrofuran and 25 ml. of epsilon-caprolactone. A diol having a molecular weight of 2000 and an acid number of 0.5 was obtained.

EXAMPLE 4

Example 1 was repeated with the exception that 50 ml. of nitrobenzene was used as the solvent in the cathode compartment in place of the mixture of 25 ml. of tetrahydrofuran and 25 ml. of epsilon-caprolactone. The diol obtained had a molecular weight of 1970 and an acid number of 0.7.

EXAMPLE 5

Example 1 was repeated with the exception that 0.1 gram of ammonium fluoroborate was substituted for the 1 gram of n-tetrabutylammonium perchlorate. The diol had a molecular weight of 2050 and an acid number of 0.8.

EXAMPLE 6

In order to show the equivalence between epsilon-caprolactone/ethylene oxide diol copolymer made through the practice of this invention and one made by the use of boron trifluoride etherate catalyst samples of each copolymer were compared by preparing a polyurethane from 1 mole of epsilon-caprolactone/ethylene oxide diol copolymer, 1 mole of 1,4-butane diol and 2 moles methylene bis(4-phenylisocyanate) (MDI). One mole of the diol copolymer made in Example 1 was vacuum degassed at 100° C. until bubble free at about 0.1 inch Hg pressure. The temperature was raised to 180° C. and this polymer weighed into a tared two part steel mold. Then 1 mole of 1,4-butane-diol was added to the polymer with stirring at which time the temperature of the mixture was about 150° C. Flaked MDI (2 moles) was added to the mold with agitation for 2 to 3 minutes. The stirrer was removed and the mixture was cured in a mold for 1 hour at 150° C. in a forced draft air oven. The resultant polyurethane was granulated and compression molded into plaques 0.075 inch by 4.5 inches by 7 inches to provide suitable test specimens. The mechanical properties of the polyurethane prepared above are recorded in the table below.

Tensile Modulus (p.s.i.) _____ 1720
Tensile Modulus (p.s.i.) _____ 290
Tensile Modulus 100° C. (p.s.i.) _____ 160
Tensile Modulus 300° C. (p.s.i.) _____ 275
Elongation, percent _____ 1160
Recovery _____ Good

Control A

Example 6 above was repeated with the exception that the epsilon-caprolactone/ethylene oxide copolymer diol was prepared as described in Example 23 run D of U.S. Pat. 2,962,525 (issued Nov. 29, 1960 to F. Hostettler and R. W. McLaughlin) wherein boron trifluoride etherate was used as the catalyst. This polyurethane when evaluated as above in Example 6 had a tensile strength of 1780 p.s.i., and elongation of 1050 percent and a 100 percent tensile modulus of 245 p.s.i.

EXAMPLE 7

Using the electrolysis apparatus described in Example 1, the anode compartment of the electrolysis cell was charged with a solution of 10 ml. of epsilon-caprolactone and 0.1 gm. of tetramethyl ammonium fluoroborate. The cathode compartment was charged with a solution of 15 ml. of epsilon-caprolactone, 15 ml. of N,N-dimethylformamide and 0.1 gram of tetramethylammonium fluoroborate. A platinum electrode served as the anode while lead was employed as the cathode. A direct current was passed through the cell until 50 coulombs had been added. The contents of the anode chamber were then passed into a 250 ml. three-necked flask containing 100 ml. of ethylene sulfide equipped with a mechanical stirrer, condenser and thermometer. The contents of the flask were stirred for 30 minutes after which time the solution became very viscous. A 95% yield of polyethylene sulfide was obtained.

EXAMPLE 8

Using the procedure described in Example 7 the anode compartment of the electrolysis cell was charged with a solution of 10 ml. of tetrahydrofuran and 0.1 gram of tetramethylammonium fluoroborate. The cathode compartment was charged with a solution of 15 ml. of epsilon-caprolactone, 15 ml. of N,N-dimethylformamide and 0.1 gram of tetramethylammonium fluoroborate. A direct current was passed through the electrolysis cell until 100 coulombs had been added. The contents of the anode compartment were then added to the three-necked flask containing 150 ml. of tetrahydrofuran. The flask was heated to 50° C. with stirring and maintained at this temperature for about 8 hours. The viscous solution which resulted was dissolved in benzene and polytetrahydrofuran was recovered by pouring the benzene solution into an excess of methanol which precipitated the polymer product.

EXAMPLE 9

Using the procedure described in Example 7, 15 ml. of tetrahydrofuran was electrolyzed in the anode compartment with 0.1 gram of tetrabutylammonium perchlorate and 30 ml. of tetrahydrofuran and 1 gram of tetrabutylammonium perchlorate in the cathode compartment by passing 100 coulombs through the electrolysis cell at about 40 volts D.C. and an average between 0.3 and 0.5 amp. The contents of the anode compartment were then charged into the three-neck polymerization flask together with 100 ml. of tetrahydrofuran. This afforded a ratio of 0.023 Faraday per mole of tetrahydrofuran. Polymerization was allowed to proceed with stirring at 25° C. for 24 hours. A yield of 75% polytetrahydrofuran was obtained which polymer had a reduced viscosity of 1.6 when measured in benzene as a 0.2% solution at 25° C.

A sample of polytetrahydrofuran made by these procedures exhibited the following physical contents:

Tensile Modulus (p.s.i.) _____ 21,000
Glass transition temperature ($T_g$) (° C.) _____ −72
Tensile Strength (p.s.i.) _____ 3,500
Elongation, percent _____ 830
Melting point (° C.) _____ 40

EXAMPLE 10

Example 7 was repeated with the exception that 250 coulombs of electricity were passed through the electrolysis cell. This provided a ratio of 0.046 Faraday per mole of tetrahydrofuran in the polymerization flask. Polymerization was allowed to proceed for 24 hours at 25° C. resulting in the yield of 75% of polytetrahydrofuran having a reduced viscosity of 0.79.

EXAMPLE 11

Using the procedure described in Example 7 with the exception that 15 grams of 3-methyl,3-ethyl thiacyclobutane was charged to the anode compartment of the electrolysis cell with .1 gram of tetrabutylammonium chlorate and 30 ml. of THF was charged to the cathode compartment with 1 gram of tetrabutylammonium perchlorate. The contents of the anode compartment were charged to the polymerization flask together with 100 grams of 3-methyl,3-ethyl thiacyclobutane resulting in a ratio of 0.17 Faraday per mole of thiacyclobutane. Polymerization was allowed to proceed 25° C. for 6 hours resulting in a yield of 50% of poly(3-methyl,3-ethyl thiacyclobutane) having a reduced viscosity of 0.32.

EXAMPLE 12

Using the procedure described in Example 7 100 grams of ethylene oxide and .1 gram of tetrabutylammonium perchlorate were charged to the anode compartment and 50 grams of caprolactone with 0.5 gram of tetrabutylammonium perchlorate to the cathode compartment and electrolysis allowed to proceed until 200 coulombs passed through the electrolytic cell. The contents of the anode compartment were charged to the polymerization flask together with 100 grams of ethylene oxide at a temperature of −20° C. The ratio of Faraday per mole of ethylene oxide in the reaction flask was 0.17. Polymerization was allowed to proceed at −20° C. for 48 hours resulting in a 30% yield of polyethylene oxide.

EXAMPLE 13

The procedure described in Example 7 was followed with 15 grams of ethyleneimine and 0.1 gram of tetrabutylammonium perchlorate in the anode compartment and 30 grams of THF and 1 gram of tetrabutylammonium perchlorate in the cathode compartment. The electrolysis cell was activated until 2650 coulombs passed through. The contents of the anode compartment were charged to the reaction flask with 100 grams of ethyleneimine. The ratio of Faradays per mole of ethyleneimine in the reaction flask was 0.15. Polymerization was allowed to proceed for 72 hours at 25° C. affording a yield of 55% poly(ethyleneimine).

EXAMPLE 14

The procedure described in Example 7 was employed with 15 grams of epsilon-caprolactone and 0.1 gram of tetrabutylammonium perchlorate in the anode compartment and 30 grams of DMF and 1 gram of butylammonium perchlorate in the cathode compartment. 200 coulombs were passed through the electrolysis cell and the contents of the anode compartment charged to the polymerization flask with 100 grams of epsilon-caprolactone. The ratio of Faradays per mole of caprolactone was 0.020. Polymerization was conducted for 48 hours at 150° C. affording 98% yield of poly(epsilon-caprolactone). The reduced viscosity of the product was 0.32.

EXAMPLE 15

A charge consisting of 60 g. of epsilon-caprolactone, 20 g. of epichlorohydrin and 4.29 g. of diethylene glycol was prepared and 20 ml. of this mixture together with 0.1 g. of NH₄BF₄ was placed in the anode compartment of the electrolysis cell described in Example 1. The remainder was placed in a 250 ml. three-necked polymerization flask equipped with a mechanical stirrer, condenser and thermometer. The cathode compartment of the electrolysis cell was charged with 25 ml. of a 50:50 (volume:volume) mixture of tetrahydrofuran and epsilon-caprolactone and 1 g. of NH₄BF₄.

About 600 coulombs was passed through the electrolysis cell at ambient temperatures. The contents of the anode compartment were then added to the polymerization flask which was heated to about 80° C. with stirring. Polymerization was allowed to proceed for about 48 hours affording an almost quantitative yield of a copolymer having a molecular weight of about 2000 as measured by a percent hydroxyl determination. This diol copolymer had repeating units represented by the formulae:

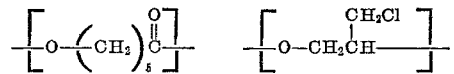

EXAMPLE 16

The anode compartment of the electrolysis cell described in Example 1 was charged with 20 g. of epsilon-caprolactone and 0.1 g. of NH₄BF₄. The cathode compartment of this cell was charged with 30 ml. of epsilon-caprolactone, 10 ml. of tetrahydrofuran and 1 g. of NH₄BF₄. The cathode compartment of this cell was charged with 30 ml. of epsilon-caprolactone, 10 ml. of tetrahydrofuran and 1 g. of NH₄BF₄. Two hundred and twenty coulombs were passed through the electrolysis cells at ambient temperatures and then the contents of the anode compartment were passed into a 250 ml. three-necked polymerization flask equipped with a dropping funnel, a mechanical stirrer and condenser and containing 135 g. of epsilon-caprolactone and 7.8 g. of diethylene glycol. The dropping funnel was charged with 30 g. of ethylene sulfide, and the ethylene sulfide added dropwise to the contents of the polymerization flask with agitation at a temperature of about 90° C. When the addition of ethylene sulfide was complete, polymerization was allowed to continue overnight. A quantitative yield of copolymer was obtained having a molecular weight of about 2200. This copolymer is believed to have repeating units represented by the formulae:

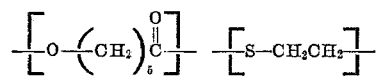

A polyurethane made as described in Example 6 with the exception that the above-described copolymer was substituted for that in Example 6 had a melting point of about 200° C. and was resistant to common solvents including tetrahydrofuran, acetone, methylethyl ketone and toluene.

EXAMPLE 17

Example 1 was repeated with the exception that propylene oxide was substituted for the ethylene oxide on a molar basis. A copolymer was obtained having a molecular weight of about 2000 and repeating units represented by the formulae:

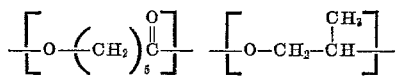

Although the invention has been described in its preferred forms, it is understood that the present disclosure has been made only by way of example, and that numerous changes in the details may be resorted to without departing from the spirit and scope of the invention.

What is claimed is:
1. Method of polymerizing heterocyclic monomers which comprises the steps of:
(A) Preparing a polymerization catalyst in a divided electrolysis cell having an anolyte compartment and a catholyte compartment by electrolyzing: (1) a solution of at least one heterocyclic monomer having the formula:

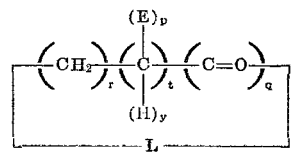

wherein r is an integer having values of 2 to 5, each of p and y is an integer having values of 0 to 2 wherein $p+y=2$, t is an integer having values of 0 to 1, E is a monovalent radical selected from the class consisting of chlorine, lower alkyl having 1 to 3 carbon atoms, phenyl and lower alkyl substituted phenyl, q is an integer having values of 0 or 1, and L is a divalent radical selected from the group consisting of —O—, —S—, or —NH—, with at least 0.006%, based on the weight of said heterocyclic compound, of a supporting electrolyte having the formula:

$$A^+(M^-)_z$$

wherein z is an integer having values of 1 to 2 and A is a cation selected from the group consisting of alkali metals, alkaline earth metals, and quaternary onium ions having the formula $(R)_4D^+$ wherein each of R is a monovalent radical selected from the group consisting of hydrogen, alkyl having 1 to 10 carbon atoms or aryl having 6 to 10 carbon atoms and D is an element selected from the group consisting of nitrogen and phosphorus and M is an anion selected from the group consisting of $BF_4^-$, $ClO_4^-$, $PF_6^-$, $HF_2^-$, $-O_3SC_6-CH_3$, or $CO_3^{--}$ in the anolyte compartment and (2) a solution of at least 0.006% by weight of a supporting electrolyte selected from the group consisting of (a) $(R)_4N^+M^-$ wherein R and M are as defined above and N is nitrogen (b) $(R)_4B^-Q^+$ wherein R is as defined above, B is boron, and Q is a cation selected from the group consisting of Li, K, Na, Ca, Mg or Zn, (c) $(R)_4Al^-Q^+$ wherein Al is aluminum and R and Q are as defined above, (d) alkali metal halides, and
(e) alkaline earth halides
  in a polar solvent in the catholyte compartment said polar solvent being selected from the group consisting of:
    (1) aliphatic hydrocarbons substituted by nitro, sulfone, sulfoxide, cyano, carbonate or halogen groups,
    (2) nitrobenzene,
    (3) dimethyl formamide,
    (4) cyclic ethers, and
    (5) alicyclic esters
at a temperature of about —20 to 200° C. with at least 0.001 Faraday per mole of heterocyclic compound;

(B) Mixing about 0.1 to 10 parts by weight of the catalyst prepared in the anolyte compartment in (A) above with about 100 parts by weight of at least 1 heterocyclic monomer having the formula:

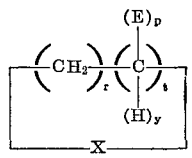

wherein X is a divalent radical selected from the group consisting of —O— or —S—, and r, p, t, y and E are as defined above under an inert atmosphere in a closed polymerization system;

(C) Agitating the mixture of (B) for at least 1 minute at a temperature of about —20 to 200° C.; and (D) Recovering the polymerized product.

2. Method claimed in claim 1 wherein the heterocyclic monomer in (A) and (B) is 1,2-propylene oxide.

3. Method claimed in claim 1 wherein the heterocyclic monomer in (A) and (B) is an ethylene sulfide.

4. Method claimed in claim 1 wherein the heterocyclic monomer in (A) and (B) is epichlorohydrin.

5. Method claimed in claim 1 wherein step (C) is carried out at a temperature of about 20 to 40° C.

6. Method claimed in claim 1 wherein the polymerization catalyst is prepared in step (A) with at least 0.01 Faraday per mole of monomer.

7. Method claimed in claim 1 wherein the polar solvent is a 1:1 volume:volume mixture of ε-caprolactone and tetrahydrofuran.

8. Method claimed in claim 1 wherein the polar solvent is nitrobenzene.

9. Method claimed in claim 1 wherein 0.1 to 5 parts by weight of a polymerization starter selected from the group consisting of aliphatic polyols, ether polyols, and ester polyols having 2 to about 10 carbon atoms, per 100 parts of monomer is added to mixture (B).

10. Method claimed in claim 9 wherein the starter is ethylene glycol.

References Cited

Yamazaki, Advances in Polymer Science 6, 377 (1969).
Hamann, Makromolekulare Chemie 99, 103 (1966).

WILLIAM H. SHORT, Primary Examiner

E. A. NIELSEN, Assistant Examiner

U.S. Cl. X.R.

204—59; 260—2 A, 2BP, 2 XA, 2 D, 77.5 AN, 78.3 R, 95 R, 520, 615 B